(12) United States Patent
Nate et al.

(10) Patent No.: US 7,052,735 B2
(45) Date of Patent: May 30, 2006

(54) METHOD OF PLUGGING AT LEAST SOME OF THE CELLS OF A HONEYCOMB STRUCTURE

(75) Inventors: Masayuki Nate, Nagoya (JP); Takahisa Kaneko, Nagoya (JP); Yukihisa Wada, Nishin (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/514,839

(22) PCT Filed: Jun. 26, 2003

(86) PCT No.: PCT/JP03/08147

§ 371 (c)(1),
(2), (4) Date: Nov. 18, 2004

(87) PCT Pub. No.: WO2004/002607

PCT Pub. Date: Jan. 8, 2004

(65) Prior Publication Data

US 2005/0221014 A1 Oct. 6, 2005

(30) Foreign Application Priority Data

Jun. 27, 2002 (JP) ............................. 2002-187624

(51) Int. Cl.
*B05D 7/22* (2006.01)
*B05D 3/12* (2006.01)
*B05D 1/18* (2006.01)

(52) U.S. Cl. .................. 427/230; 427/231; 427/346; 427/430.1

(58) Field of Classification Search ................ 427/230, 427/231, 346, 430.1; 29/890
See application file for complete search history.

(56) References Cited

U.S. PATENT DOCUMENTS

| 4,559,193 A | 12/1985 | Ogawa et al. |
| 4,818,317 A | 4/1989 | Otaka et al. |
| 2002/0066982 A1* | 6/2002 | Yamaguchi et al. ........ 264/631 |

FOREIGN PATENT DOCUMENTS

JP A 9-25180 1/1997

* cited by examiner

*Primary Examiner*—Timothy Meeks
*Assistant Examiner*—William Phillip Fletcher, III
(74) *Attorney, Agent, or Firm*—Oliff & Berridge, PLC

(57) ABSTRACT

A method of producing a honeycomb structure of the present invention includes the steps of: forming plugged portions by dipping an end face of a honeycomb structure in slurry in a container, and pressing the honeycomb structure against an inner bottom surface of the container to force the slurry into at least some of the cells; and bringing out the honeycomb structure from the container to obtain the honeycomb structure having at least some of the cells being plugged. An air layer is formed between the plugged portions and the inner bottom surface of the container to separate them from each other in advance of bringing out the honeycomb structure having plugged portions from the container.

8 Claims, 10 Drawing Sheets

Related Art

Related Art

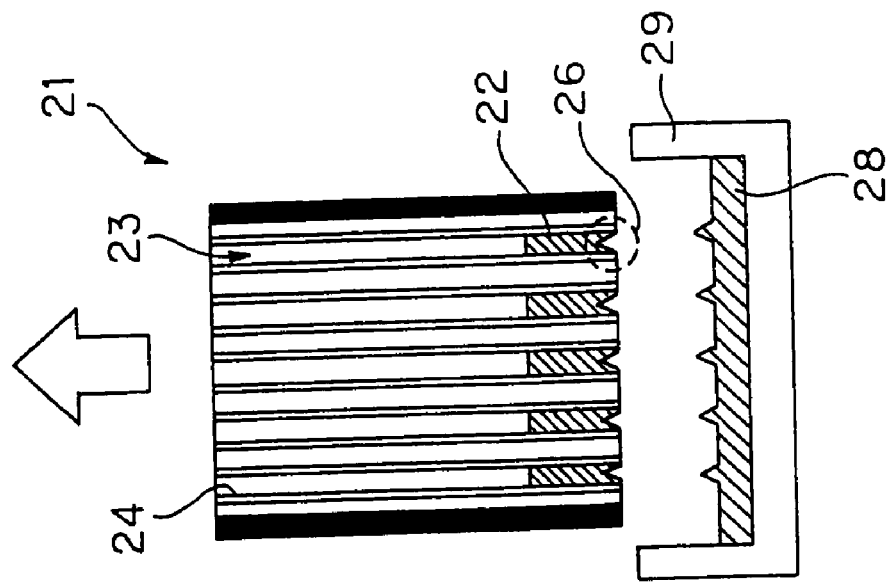
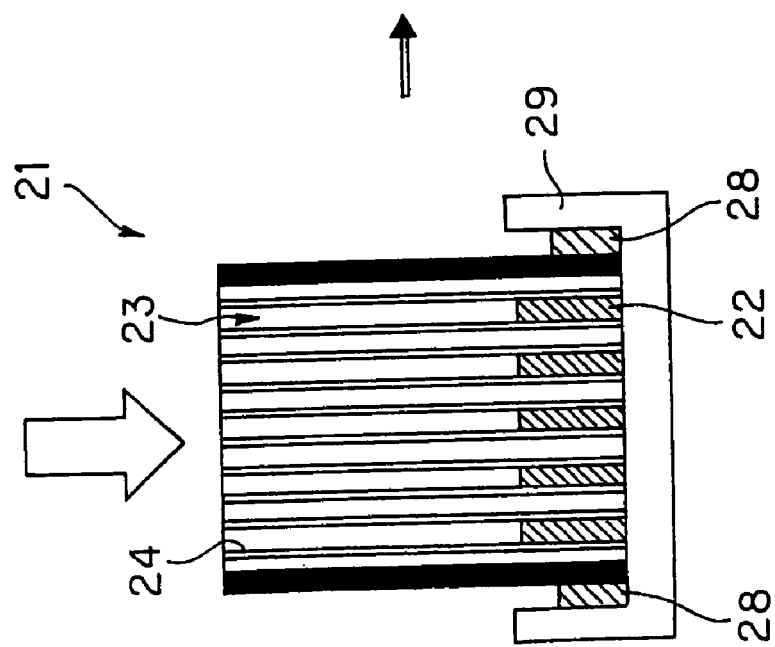
FIG. 4(a)
FIG. 4(b)
Related Art

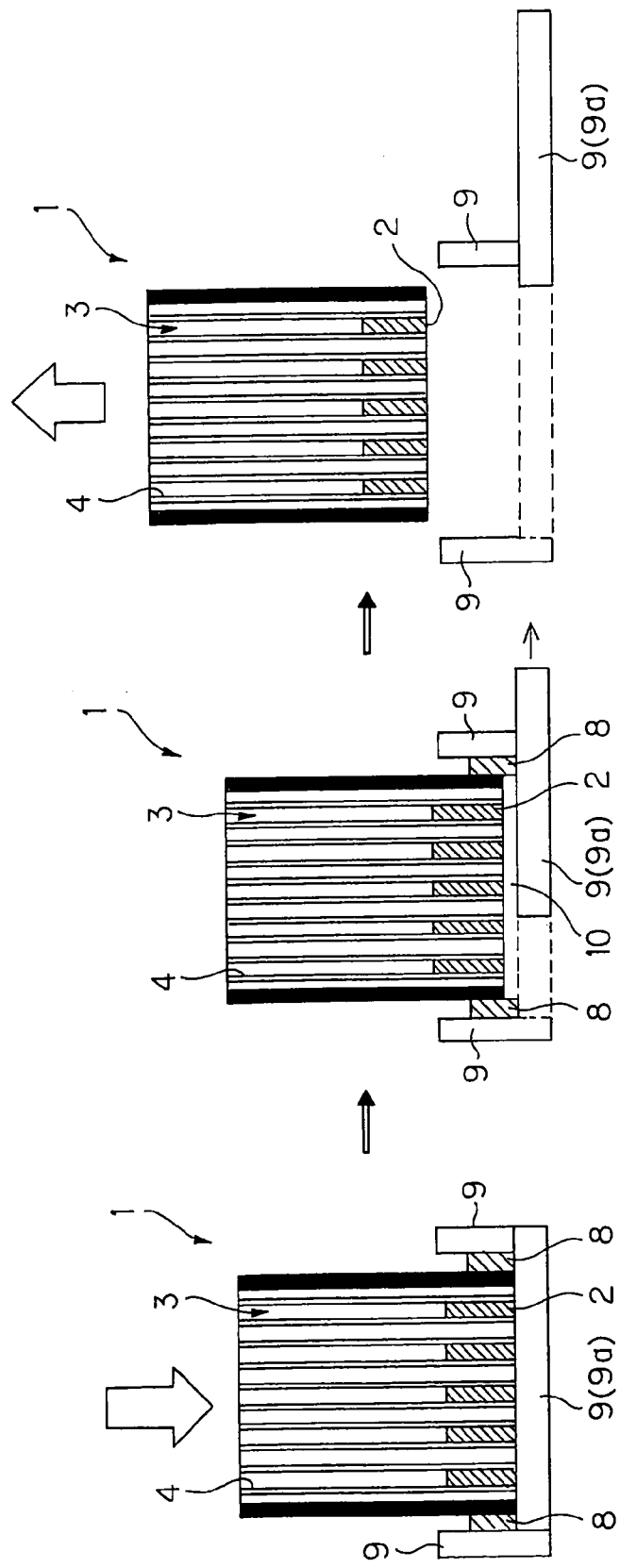

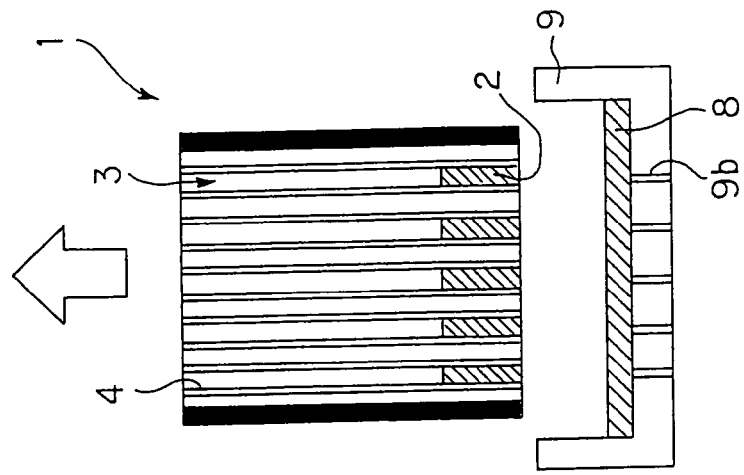
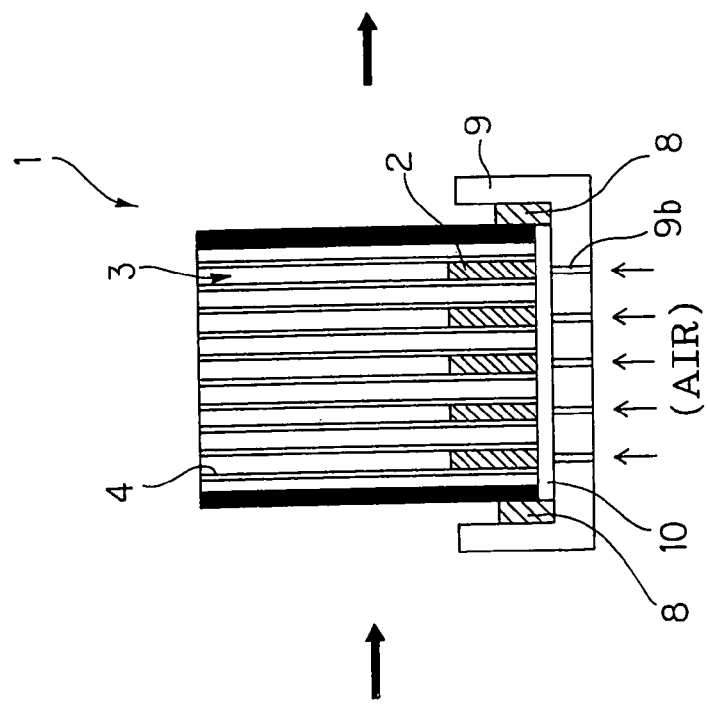
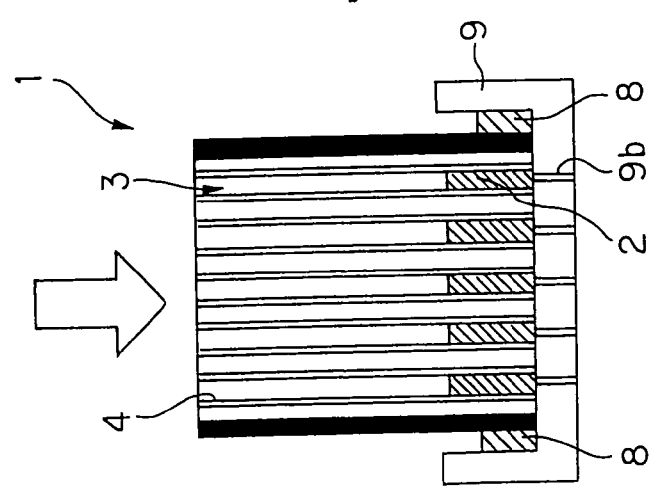

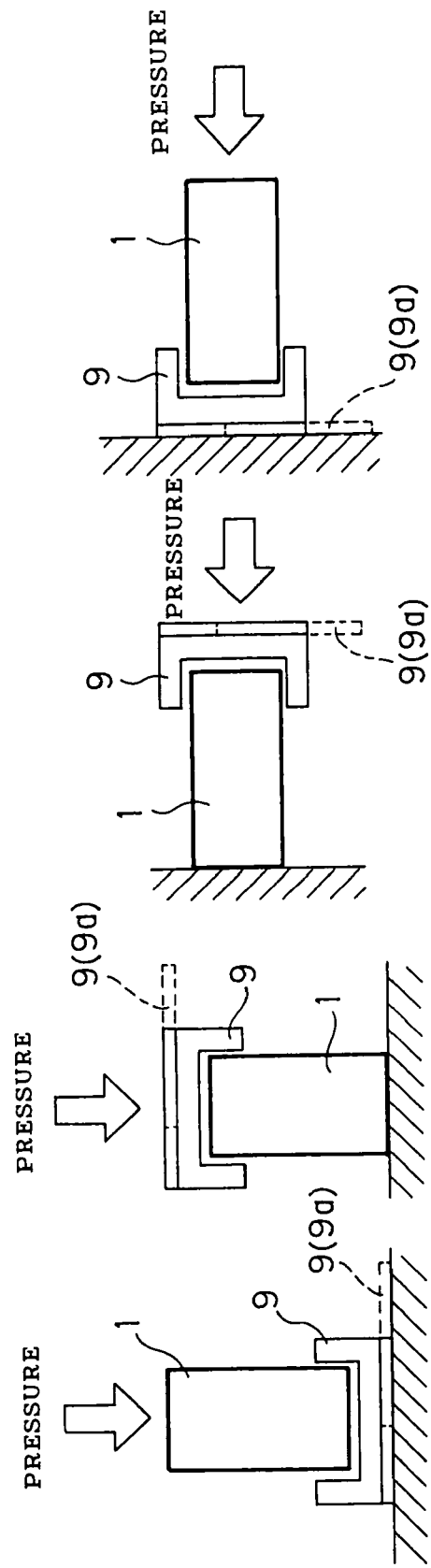

METHOD OF PLUGGING AT LEAST SOME OF THE CELLS OF A HONEYCOMB STRUCTURE

TECHNICAL FIELD

The present invention relates to a method of producing honeycomb structures wherein at least some of the cells are plugged, which is suitably used, for example, as a dust-collecting filter.

BACKGROUND ART

In recent years, ceramic honeycomb structures superior in heat resistance and corrosion resistance have been used as a dust-collecting filter for environmental management (e.g. pollution control), product recovery from high-temperature gas, etc. in various sectors including chemistry, electric power, steel and industrial waste treatment. Ceramic honeycomb structures are suitably used, for example, as a dust-collecting filter for use in a high-temperature, corrosive gas atmosphere such as a diesel particulate filter (DPF) for trapping particulates emitted from a diesel engine.

The honeycomb structure used as the above dust-collecting filter is required to have a constitution low in pressure loss and capable of giving a high trapping efficiency. For the requirements, a honeycomb structure wherein at least some of the cells are plugged, for example, as shown in FIG. 2, a honeycomb structure 21 wherein an inlet end face B and an outlet end face C are plugged alternately by plugged portion 22, is used. In the honeycomb structure 21 having such a structure mentioned above, a gas $G_1$ to be treated is introduced into cells 23 from the inlet end face B, dust and particulates in the gas are trapped by partition walls 24; meanwhile, the gas which has entered adjacent cells 23 through the porous partition walls 24, is discharged as a treated gas $G_2$ from the outlet end face C, as a result, the treated gas $G_2$ wherein dust and particulates in the gas $G_1$ to be treated are removed can be obtained.

A honeycomb structure having above described plugged portions can be obtained by: forming plugged portions by dipping an end face of a honeycomb structure having cells functioning as fluid passages in slurry containing at least ceramic particles and dispersion medium in a container, and pressing the honeycomb structure against an inner bottom surface of the container to force the slurry into at least some of the cells; and bringing out the honeycomb structure having the plugged portions formed therein from the container by, for example, picking up the honeycomb structure directly.

The honeycomb structure produced by the above process, however, has had a problem of yielding defect in the plugged portions. FIG. 3 is schematic enlarged sectional drawings of the vicinity of the inlet end face B of a honeycomb structure 21. FIG. 3(i) shows a plugged portion 22 to be formed satisfactorily. In this plugged portion 22, however, a shrunk dent 26 has generated as shown in FIG. 3(ii) and, in an extreme case, there has appeared a hole 27 passing through the plugged portion 22 as shown in FIG. 3(iii).

When the shrunk dent 26 generates, there is an inconvenience of the reduced reliability of the plugged portion 22; when there appears the hole 27 passing through the plugged portion 22, dust and particles leak through the hole 27, when it is used as a dust-collecting filter, it becomes impotent as a filter. Hence, this problem has heretofore been avoided by, as shown in FIG. 3(iv), forcing a ceramic slurry (for formation of plugged portion 22) excessively into the cell 23 to make larger the depth (d) of the plugged portion. When the depth (d) of the plugged portion is made larger, however, the surface area of the partition walls 24 separating the cells 22 from each other, that is, the area of filtration is reduced, which is not preferred.

DISCLOSURE OF THE INVENTION

The present invention has been made in view of the above-mentioned problems of the prior art and aims at providing a method for producing a honeycomb structure capable of effectively inhibiting a problem of generation of shrunk dents or holes passing through the plugged portions.

The present inventors made an intensive study in order to address the above aim. As a result, it was found that the above aim can be addressed by forming an air layer between the inner bottom surface of the container and the plugged portions to separate the inner bottom surface and the plugged portions in advance of bringing out the honeycomb structure having the plugging portion formed therein from the container, then bringing out the honeycomb structure from the container. The present invention has been completed based on this finding. That is, the present invention provides the following process for producing a honeycomb structure.

(1) A method of producing a honeycomb structure comprising the steps of: forming plugged portions by dipping an end face of a honeycomb structure having cells each functioning as a fluid passage in slurry containing at least ceramic particles and dispersion medium in a container, and pressing the honeycomb structure against an inner bottom surface of the container to force the slurry into at least some of the cells; and bringing out the honeycomb structure having the plugged portions formed therein from the container to obtain the honeycomb structure having at least some of the cells being plugged: characterized by forming an air layer between the inner bottom surface of the container and the plugged portions to separate the inner bottom surface and the plugged portions in advance of bringing out the honeycomb structure from the container.

(2) The method of producing a honeycomb structure according to above (1), wherein the plugged portions is formed by masking some of the cells at the end face of the honeycomb structure, dipping masked end face of the honeycomb structure in the slurry in the container, and pressing the honeycomb structure against the inner bottom surface of the container to force the slurry into non-masked cells.

(3) The method of producing a honeycomb structure according to above (1) or (2), wherein after forming the plugged portions, by separating the plugged portions and the inner bottom surface with rotating relatively the end face having the plugged portions and the inner bottom surface of the container, the air layer between the inner bottom surface of the container and the plugged portions is formed to separate the inner bottom surface and the plugged portions in advance of bringing out the honeycomb structure.

(4) The method of producing a honeycomb structure according to above (1) or (2), wherein after forming the plugged portions, by moving a bottom portion of the container in a lateral direction to open a bottom surface of the container, the air layer between the inner bottom surface of the container and the plugged portions is formed to separate the inner bottom surface and the plugged portions in advance of bringing out the honeycomb structure.

(5) The method of producing a honeycomb structure according to above (1) or (2), wherein after forming the plugged portions, by introducing air between the plugged portions and the inner bottom surface of the container, the air layer between the inner bottom surface of the container and the plugged portions is formed to separate the inner bottom surface and the plugged portions in advance of bringing out the honeycomb structure.

BRIEF DESCRIPTION OF THE DRAWINGS

FIG. 1(a) is a schematic view showing a step of forming plugged portions, FIG. 1(b) is a schematic view showing a step of forming an air layer and FIG. 1(c) is a schematic view showing a step of bringing out the honeycomb structure.

FIG. 4(a) and FIG. 4(b) are process drawings showing steps of an embodiment of an ordinary method of producing a honeycomb structure. FIG. 4(a) is a schematic view showing a step for forming plugged portions, and FIG. 4(b) is a schematic view showing a step of bringing out the honeycomb structure.

FIG. 5(a) is a schematic view showing a step of forming plugged portions, FIG. 5(b) is a schematic view showing a step of forming an air layer and FIG. 5(c) is a schematic view showing a step of bringing out the honeycomb structure.

FIG. 6(a) to FIG. 6(c) are process drawings showing still another embodiment of the present method of producing a honeycomb structure. FIG. 6(a) is a schematic view showing a step of forming plugged portions, FIG. 6(b) is a schematic view showing a step of forming an air layer and FIG. 6(c) is a schematic view showing a step of bringing out the honeycomb structure.

FIG. 7(a) to FIG. 7(c) are process drawings showing still another embodiment of the present method of producing a honeycomb structure. FIG. 7(a) is a schematic view showing a step of forming plugged portions, FIG. 7(b) is a schematic view showing a step of forming an air layer and FIG. 7(c) is a schematic view showing a step of bringing out the honeycomb structure.

FIG. 8(a) is a schematic perspective view showing a cylindrical honeycomb structure, FIG. 8(b) is a schematic perspective view showing a quadratic prism-shaped honeycomb structure and FIG. 8(c) is a schematic perspective view showing a triangular prism-shaped honeycomb structure.

FIG. 9(a) is a schematic view showing a tetragonal cell, FIG. 9(b) is a schematic view showing a hexagonal cell and FIG. 9(c) is a schematic view showing a triangular cell.

FIG. 10(a) to FIG. 10(d) are schematic views showing a method of pressing slurry.

BEST MODE FOR CARRYING OUT THE INVENTION

Figure 1A:
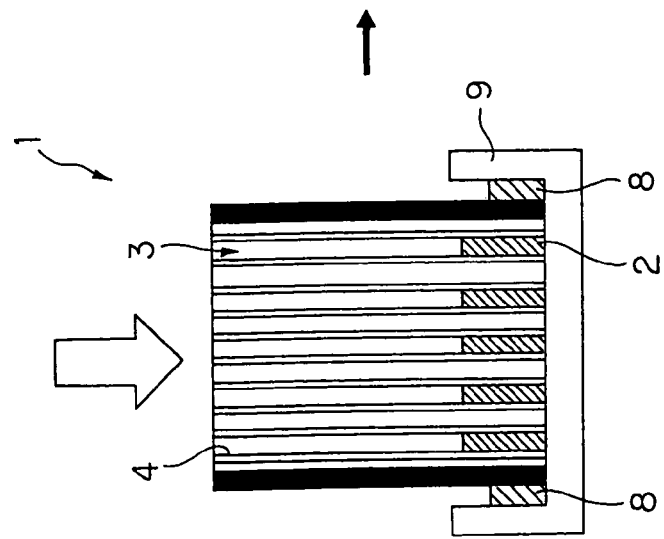
FIG. 1(a) to FIG. 1(c) are process drawings showing an embodiment of the present method of producing a honeycomb structure.

The mode for carrying out the method of producing honeycomb structures of the present invention is specifically described below referring to the accompanying drawings.

In developing the method of producing honeycomb structures of the present invention, the present inventors first investigated the reason why shrunk dents in plugged portions or holes passing through plugged portions are generated. As a results, it was found that when slurry is forced into cells to form plugged portions of a honeycomb structure, and bringing out the honeycomb structure having the plugged portions formed therein from a container by, for example, picking up the honeycomb structure directly by a conventional method, the plugged portions (slurry forced in the cells) and the inner bottom surface of the container form a coherent state, which causes generation of shrunk dents in plugged portions or holes passing through plugged portions.

To be specific, in producing a honeycomb structure having plugged portions, plugged portions 22 are formed by dipping an end face of a honeycomb structure 21 in slurry 28 in a container 29, and pressing the honeycomb structure 21 against an inner bottom surface of the container 29 to force the slurry 28 into at least some of the cells 23 partitioned by partition walls 24 as shown in FIG. 4(a). When the slurry 28 is forced into the cells, negative pressure acts on plugged portions 22 (slurry 28 forced into the cells 23), and thereby the plugged portions 22 and the inner bottom surface of the container 29 form a coherent state. If the honeycomb structure 21 is brought out from the container 29 in such a coherent state (state in which negative pressure is acting on plugging portions 22) by, for example, picking up the honeycomb structure 21 immersed in the slurry 28 in the container 29, it causes generation of shrunk dents 26 in plugged portions 22 or holes passing through plugged portions as shown in FIG. 4(b).

Generation of shrunk dents in plugged portions or holes passing through plugged portions as described above is due to picking up of the honeycomb structure from the container in the state where negative pressure is acting on plugging portions. Therefore, to avoid such a situation, the honeycomb structure has only to be brought out from the container after the negative pressure acting on plugging portions is released.

Figure 1B:
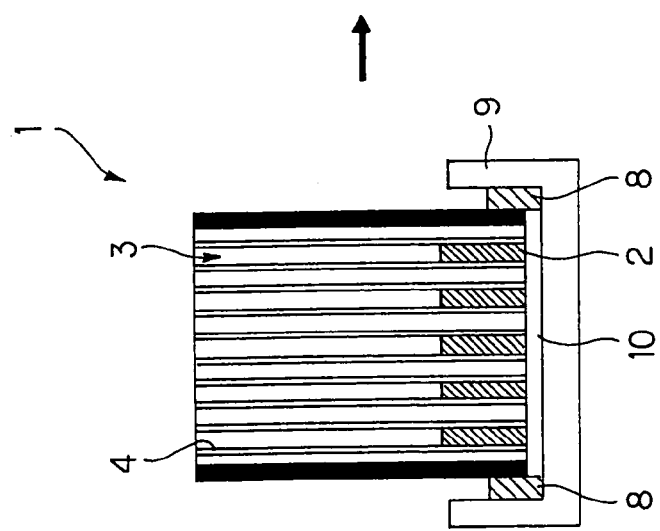
Figure 1C:
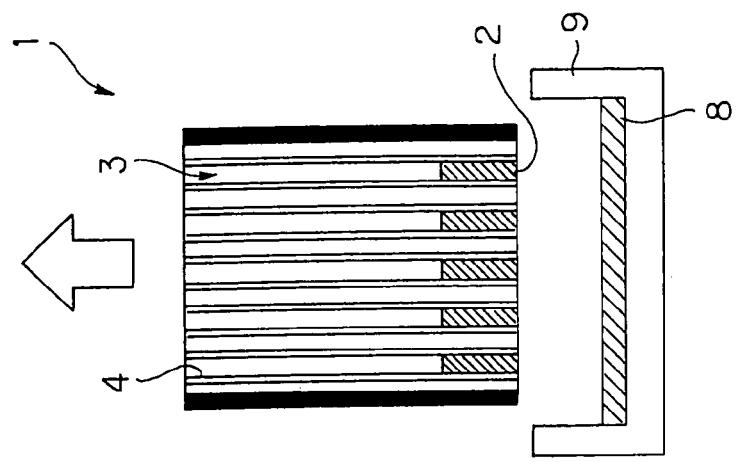
Figure 2:
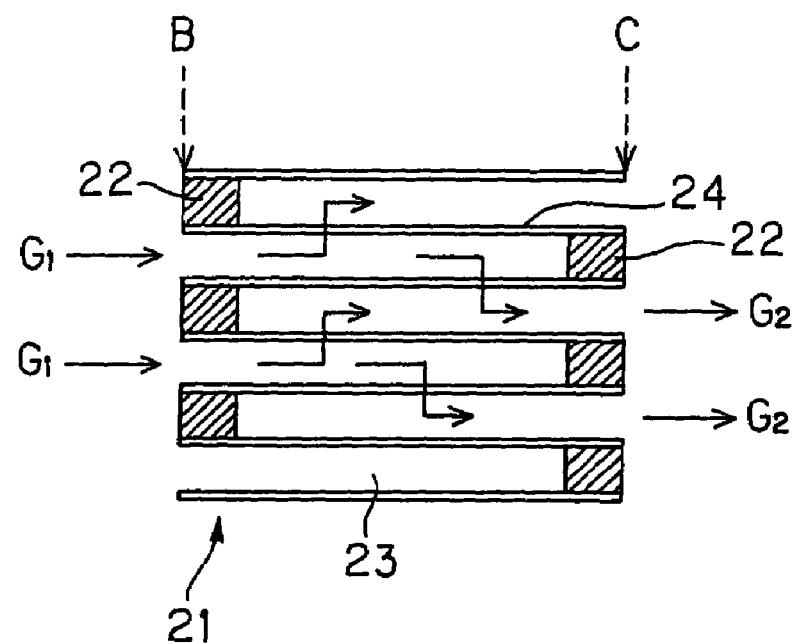
FIG. 2 is a schematic view showing the constitution of an ordinary honeycomb structure.
Figure 3:
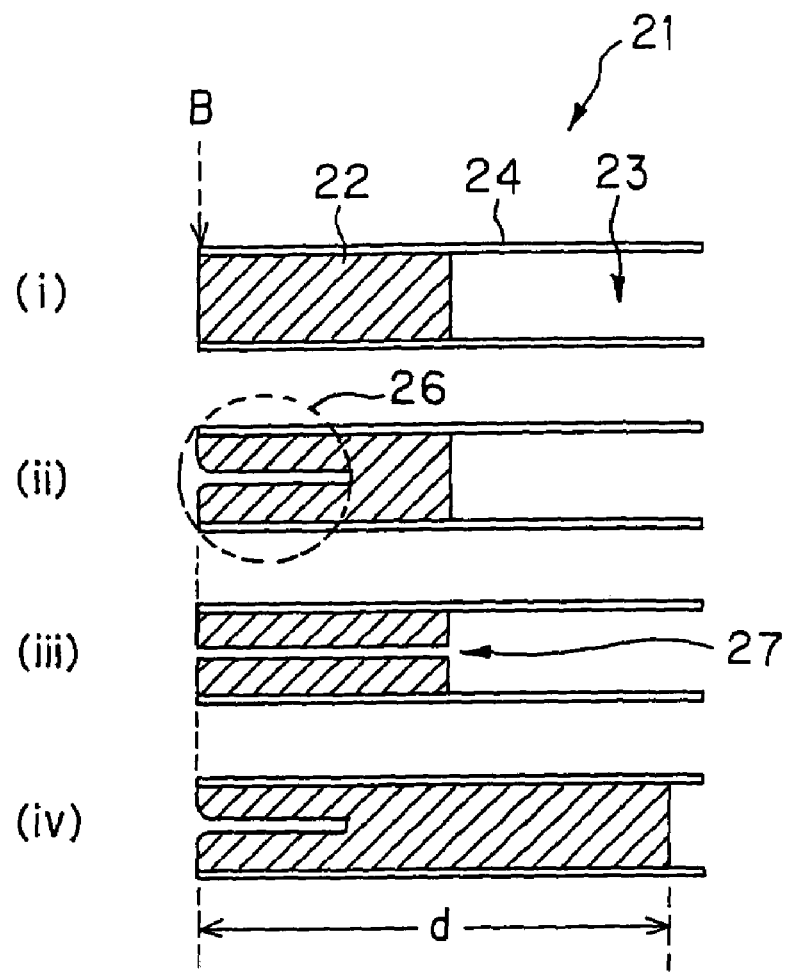
FIG. 3 is a schematic enlarged sectional view showing the vicinity of an inlet end face of a honeycomb structure.

Accordingly, in the present invention, the honeycomb structure is not brought out from the container with the plugged portions and the inner bottom surface of the container forming the coherent state (state in which negative pressure is acting on plugging portions), but the honeycomb structure 1 is brought out from the container 9 after forming an air layer 10 between the plugged portions 2 and the inner bottom surface of the container 9 to separate them in advance as shown in FIGS. 1(a) to 1(c). This can release the negative pressure acting on the plugged portions 2 upon forcing the slurry 8 into the cells, and the honeycomb structure 1 is brought out from the container 9 after the coherent state of the plugged portions and the inner bottom surface of the container is dissolved. Therefore, generation of shrunk dents in the plugged portions 2 or generation of holes passing through the plugged portions 2 can effectively be inhibited.

In the present method, since generation of shrunk dents or the like can be inhibited, it is also possible to make as small as about 1 to 5 mm the depth of plugging which has heretofore been as large as about 10 mm (this is larger than necessary). Therefore, plugging of cells 3 can be conducted effectively without decreasing the surface area of partition walls 4 (see FIG. 1(a) to FIG. 1(c)) separating the cells 3 from each other, i.e. the filtration area of a filter.

The honeycomb structure produced by the present method is a ceramic honeycomb structure having a plurality of cells each functioning as a passage of a fluid. There is no particular restriction as to the material thereof as long as it is a ceramic. There can be mentioned, for example, one comprising cordierite.

Figure 8C:
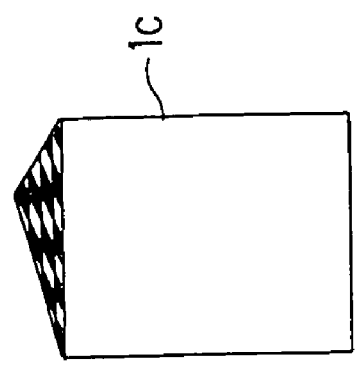
FIG. 8(a) to FIG. 8(c) are schematic perspective views- showing shapes of honeycomb structures.
Figure 8B:
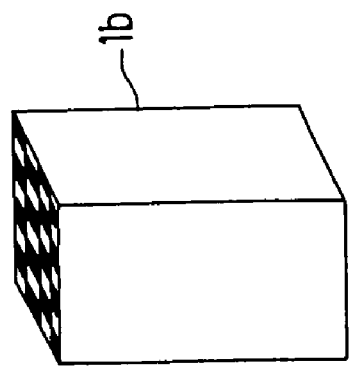
Figure 8A:
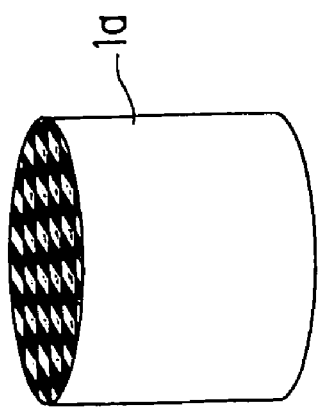
Figure 9C:
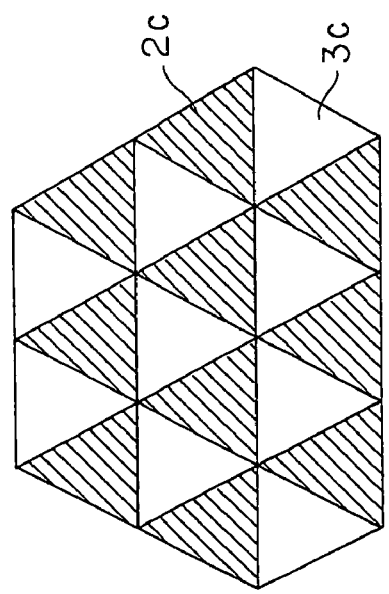
FIG. 9(a) to FIG. 9(c) are schematic views showing cell shapes.
Figure 9B:
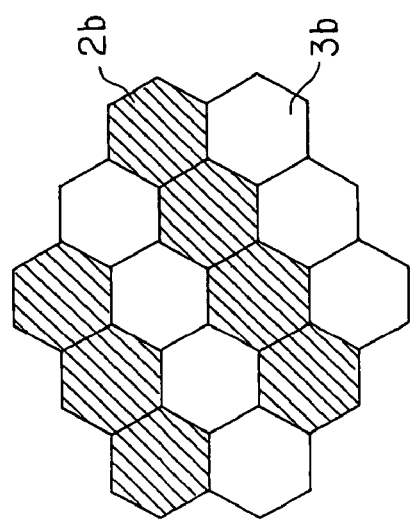
Figure 9A:
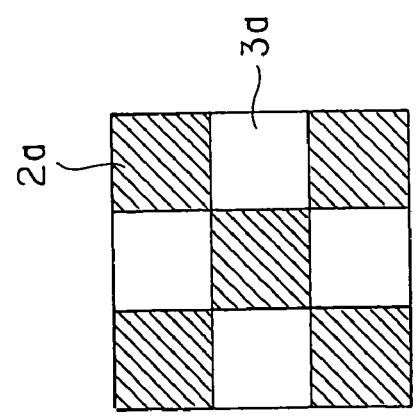

There is no particular restriction as to the shape of a honeycomb structure. There can be mentioned, for example, as shown in FIG. 8(a) to FIG. 8(c), a cylindrical honeycomb structure 1a, a quadratic prism-shaped honeycomb structure 1b and a triangular prism-shaped honeycomb structure 1c. There is no particular restriction as to the shape of a cell. There can be mentioned, for example, as shown in FIG. 9(a) to FIG. 9(c), a tetragonal cell 3a, a hexagonal cell 3b and a triangular cell 3c. There is no particular restriction as to the process for producing the honeycomb structure. There can be suitably used, for example, a process of subjecting clay having appropriately controlled viscosity to extrusion using an extrusion die having a desired cell shape, partition wall thickness and cell density, then drying the resulting extrudate.

In the present production method, in order to form plugged portions at some of the cells, the other cells may be masked at an end face of the honeycomb structure.

There is no particular restriction as to the process for masking. There can be mentioned, for example, a method of attaching an adhesive film to the whole area of an end face of the honeycomb structure and making holes partially in the adhesive film. Specifically, there can be suitably used, for example, a method of attaching an adhesive film to the whole area of an end face of the honeycomb structure and then making holes, by a laser, only in those areas of the film corresponding to the cells in which plugged portions need be formed. As the adhesive film, there can be suitably used, for example, one obtained by coating an adhesive to one side of a film of resin such as polyester, polyethylene or thermosetting resin.

In a production method of the present invention, as shown in FIG. 1(a), plugged portions 2 are formed by dipping an end face of a honeycomb structure 1 in slurry 8 containing at least ceramic particles and dispersion medium in a container 9 in the first place, and pressing the honeycomb structure 1 against an inner bottom surface of the container 9 to force the slurry 8 into at least some of the cells 3.

In the embodiment shown in FIG. 1(a), an end face, where plugged portions are to be formed, of a honeycomb structure 1 is dipped in the slurry 8 with the end face, where plugged portions are to be formed, of a honeycomb structure 1 facing downward, and pressing the honeycomb structure 1 against an inner bottom surface of the container 9 containing the slurry 8. This enables the slurry to be forced into the cells 3, and thereby the plugged portions 2 can be formed.

There is no particular restriction as to the process for forcing the slurry into the cells. There can be mentioned, for example as shown in FIG. 10(a) to FIG. 10(d), a method of applying pressure from the honeycomb structure 1 side with disposing the honeycomb structure 1 on the upper side and the container 9 on the lower side (ref. FIG. 10(a)), a method of applying pressure from the container 9 side with disposing the container 9 on the upper side and the honeycomb structure 1 on the lower side (ref. FIG. 10(b)), a method of applying pressure from the container 9 side with disposing the honeycomb structure 1 and the container 9 in the lateral direction (ref. FIG. 10(c)), and a method of applying pressure from the honeycomb structure 1 side with disposing the honeycomb structure 1 and the container 9 in the lateral direction (ref. FIG. 10(d)).

The slurry can be produced by mixing at least a ceramic powder with a dispersion medium (e.g. water). Also, additives such as binder, deflocculant and the like may be added as necessary. As to the material for the ceramic powder, there is no particular restriction and, for example, cordierite can be suitably used. As the binder, a resin such as polyvinyl alcohol (hereinafter referred to as "PVA") can be used. And, use of a heat-gelling binder which gelates when heated, is preferred. The heat-gelling binder gelates when heated and restrains the particles of the ceramic powder; therefore, it is effective for inhibiting generation of shrunk dents. As the heat-gelling binder, methyl cellulose can be suitably used.

Incidentally, the viscosity of the slurry is generally 5 to 50 Pa·s, and preferably 10 to 20 Pa·s. When the viscosity of the slurry is too low, shrunk dents tend to generate easily, which is not preferred. Meanwhile, when the viscosity of the slurry is too high, the flow resistance of the slurry against cell wall is high and the difference in stuffing speed of slurry between the cell wall vicinity and the cell center is large. Specifically describing, the depth of plugging is smaller at the cell wall vicinity than at the cell center, and the area of contact between the honeycomb structure (cell wall) and the plugging material becomes smaller, which is not preferred. The viscosity of the slurry can be controlled by, for example, the ratio of the ceramic powder to the dispersion medium (e.g. water) or the amount of the deflocculant used.

Then, as shown in FIG. 1(b), an air layer 10 is formed between the plugged portions 2 and the inner bottom surface of the container 9 to separate them from each other, and then, as shown in FIG. 1(c) the honeycomb structure 1 having the plugged portions 2 is brought out from the container 9, thereby giving the honeycomb structure 1 where at least some of the cells 3 are plugged. Specific methods of "forming an air layer between the plugged portions and the inner bottom surface of the container to separate them from each other" include the following first to third methods.

Figure 5A:
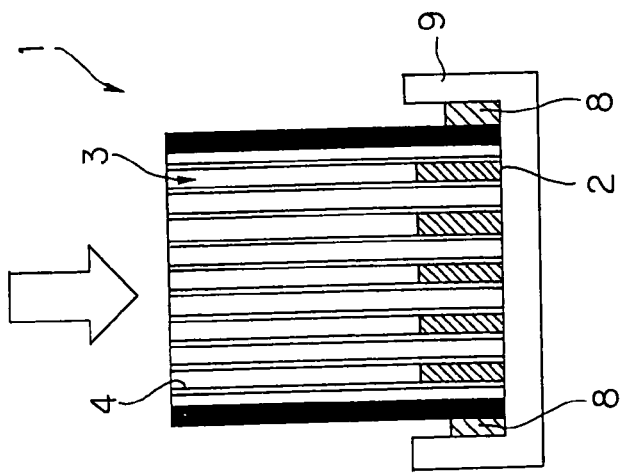
FIG. 5(a) to FIG. 5(c) are process drawings showing another embodiment of the present method of producing a honeycomb structure.
Figure 5B:
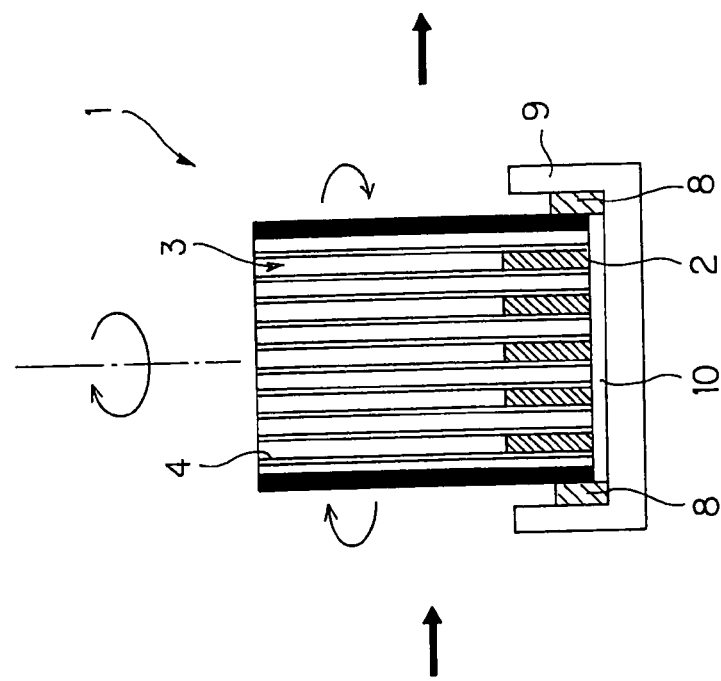
Figure 5C:
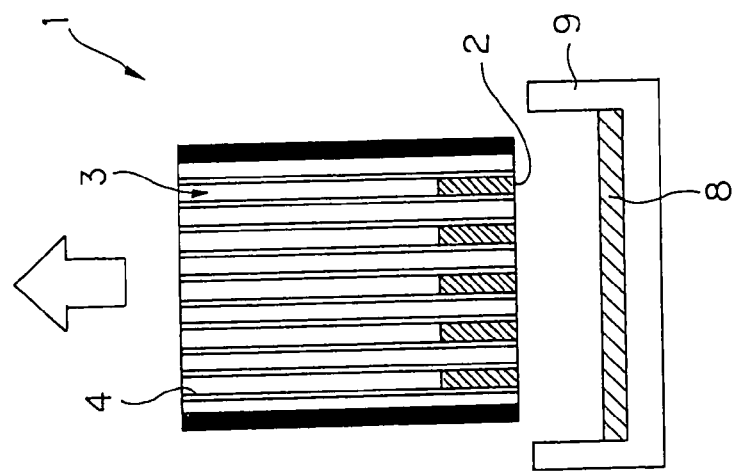

The first method is, as shown in FIG. 5(a) to FIG. 5(c) the one in which, after forming the plugged portions 2, the plugged portions 2 and the inner bottom surface of the container 9 is separated by relatively rotating the end face, where the plugged portions 2 is formed, of the honeycomb structure 1 and the inner bottom surface of the container 9. In this method, air flows in a gap between the plugged portions 2 and the inner bottom surface of the container 9 from the peripheral edge portion of the end face of the honeycomb structure 1 by relatively rotating the end face, where the plugged portions 2 is formed, of the honeycomb structure 1 and the inner bottom surface of the container 9 as shown in FIG. 5(b), and the air layer 10 is formed in the gap. Incidentally, "relatively rotating" means that the production method of the present invention includes both an operation of rotating either the end face of the honeycomb structure or the inner bottom surface of the container and an operation of rotating both the end face of the honeycomb structure and the inner bottom surface of the container.

The second method is, as shown in FIG. 6(a) to FIG. 6(c), the one in which, after forming the plugged portions 2, a bottom surface of the container 9 is opened by moving a bottom portion 9a of the container 9 in a lateral direction. In this method, as shown in FIG. 6(b), by opening a bottom surface of the container 9 by moving a bottom portion 9a of the container 9 in a lateral direction, air flows in the gap between the plugged portions 2 and a bottom surface of the container 9, and the air layer 10 is formed in the gap.

The third method is, as shown in FIG. 7(a) to FIG. 7(c), the one in which, after forming the plugged portions 2, by introducing air between the plugged portions 2 and the inner bottom surface of the container 9. In this method, as shown in FIG. 7(b), by introducing air in the gap between the plugged portions 2 and the inner bottom surface of the container 9 via air-sending hole 9b formed in the bottom of the container 9, the air layer 10 is formed in the gap.

After the air layer is formed between plugged portions and the inner bottom surface of the container in advance to separate them from each other, the honeycomb structure 1 having the plugged portions 2 formed therein may be brought out from the container 9 as shown in FIG. 1(c). In this case, the honeycomb structure 1 may be brought out by drawing the honeycomb structure 1 upward without moving the container 9 as shown in FIG. 1(c), or the container may be drawn downward with the honeycomb structure being fixed (not illustrated).

Generally, after forming the plugged portion in the honeycomb structure as described above, the plugged portions are dried, and then the whole honeycomb structure including the plugged portions is subjected to firing.

The present invention is described more specifically below by way of Examples. However, the present invention is in no way restricted by these Examples.

In the following Examples and Comparative Examples, there were used cordierite honeycomb structures each having cells functioning as fluid passages. This honeycomb structure was produced by subjecting clay having an appropriately controlled viscosity to extrusion using an extrusion die having the above-mentioned cell shape, partition wall thickness and cell density, drying the resulting extrudate, then cutting the dried extrudate at both end faces to make them flat.

At an end face of the above honeycomb structure, some of the cells were masked in order to alternately plug adjacent cells (that is, to plugg cells checkerwise). As the masking method, there was used a method of attaching an adhesive film to the whole area of the end face of the honeycomb structure and then making holes, by a laser, in the film areas corresponding to the cells in which plugged portions need be formed. As the adhesive film, there was used a commercial adhesive film (a film obtained by coating an adhesive on one side of a resin film).

Plugged portions were formed by dipping the masked end face of the honeycomb structure in slurry in the container, and the honeycomb structure was pressed against an inner bottom surface of the container to force the slurry into the cells without being masked. At this time, slurry was put in the container so as to have a flat surface and a depth of 5 mm (this depth corresponds to the depth of plugged portions). The honeycomb structure was pressed into the container with the masked end face facing the bottom of the container (perpendicularly to the surface of the slurry) with applying a pressure of 0.05–0.5 MPa, preferably 0.1–0.2 MPa, to dip the masked end face of the honeycomb structure in the slurry.

In the Examples described hereinbelow, after pressing the above honeycomb structure against an inner bottom surface of the container, by opening a bottom surface of the container by moving a bottom portion of the container in a lateral direction, the air layer is formed between the plugged portions and a bottom surface of the container to separate them from each other, and then, the honeycomb structure having plugged portions formed therein was brought out from the container (the second method of the present invention described above). On the other hand, in the Comparative Examples, after pressing the above honeycomb structure against an inner bottom surface of the container, by drawing up the honeycomb structure dipped in the slurry in the container, the honeycomb structure having plugged portion formed therein was brought out from the container (conventional method).

Incidentally, as the above slurry, there was used slurry produced by mixing a cordierite powder as a ceramic powder, methyl cellulose as a heat-gelling binder, and a high-molecular surfactant as a deflocculant, at a ratio shown in Tables 1 to 4, adding thereto water as a dispersion medium, and mixing the resulting material for 30 minutes. The slurry was set for the viscosity of 16 Pa·s.

Finally, the plugged portions formed were dried by hot air oven to obtain a honeycomb structure. In the following Examples and Comparative Examples, plugged portions were formed by a method of the present invention and a conventional method. When evaluations of the honeycomb structures for generation of shrunk dents were given, shapes of the honeycomb structures, kinds and thickness of the adhesive films used for masking, shapes of the cells of the honeycomb structures, and methods for forcing the slurry into the cells were appropriately varied to confirm influences of these factors.

Evaluations were conducted by following method. There were produced fifty honeycomb structures in each of the Examples and Comparative Examples by the methods in Examples and Comparative Examples. The number of cells having shrunk dents in each honeycomb structure was visually observed, and frequency in generation of shrunk dents of each honeycomb structure was culculated according as the following formula (1), followed by culculating the average of the frequency in generation of shrunk dents in the fifty honecomb structures. Evaluations were given with the average being defined as frequency in generation of shrunk dents in each of Examples and Comparative Examples. Incidentally, the number of plugged cells is half the number of whole cells (because cells were alternately plugged checkerwise).

$$\text{Frequency in generation of shrunk dents (\%)} = (\text{Number of cells having shrunk dents/Number of whole plugged cells}) \times 100 \quad (1)$$

EXAMPLE 1 AND COMPARATIVE EXAMPLE 1

In Example 1 and Comparative Example 1, plugged portions were formed by the second method of the present invention and a conventional method, respectively. When evaluations of the honeycomb structures for generation of shrunk dents were given, shapes of the honeycomb structures were appropriately varied to confirm influences of the shapes.

In Example 1 and Comparative Example 1, honeycomb structures having the three kinds of shapes mentioned below were used. ① Cylindrical honeycomb structure (FIG. 8(a): Reference Numeral 1a): a cylindrical shape having a circular bottom having a diameter of 144 mm and a length of 150 mm, a square cell shape, a partition wall thickness of 300 μm, cell density of 300/in², total number of cells of 7500 (Example 1-1, Comparative Example 1-1), ② quadratic prism-shaped honeycomb structure (FIG. 8(b): Reference Numeral 1b): a quadratic prism shape having a square bottom having a side of 35 mm and a length of 150 mm, a square cell shape, a partition wall thickness of 300 μm, cell density of 300/in², total number of cells of 570 (Example 1-2, Comparative Example 1-2), ③ Triangular prism-shaped honeycomb structure (FIG. 8(c): Reference Numeral 1c): a triangular prism shape having an equilateral triangular bottom having a side of 50 mm and a length of 150 mm, a square cell shape, a partition wall thickness of 300 μm, cell density of 300/in², total number of cells of 500 (Example 1-3, Comparative Example 1-3).

An adhesive film used for masking was made of polyester and had a thickness of 0.05 mm. Slurry was forced into the cells in such a manner that the honeycomb structure was disposed on the upper side and the container was disposed on the lower side and that a pressure was applied from the honeycomb structure side (referred to as "method A" in Tables).

As a result, as shown in Table 1, frequency in generation of shrunk dents, which was about 15–23% in Comparative Example 1 (conventional method), was reduced to about 1–3% in Example 1 (second method of the present invention). This tendency was the same regardless of shape of honeycomb structures. That is, in all the honeycomb structures of three kinds of shapes mentioned above, frequency in generation of shrunk dents was reduced to about 1–3%.

diameter of 144 mm and a length of 150 mm, a square cell shape, a partition wall thickness of 300 μm, cell density of 300/in$^2$, total number of cells of 7500 were used as in the Example 1-1.

Four kinds of adhesive films having the following materials and thicknesses were used for masking. ① thermosetting resin film having a thickness of 3 mm (Example 2-1, Comparative Example 2-1) ② thermosetting resin film having a thickness of 1.5 mm (Example 2-2, Comparative Example 2-2) ③ polyester film having a thickness of 0.05 mm (Example 2-3, Comparative Example 2-3) ④ polyester film having a thickness of 0.025 mm (Example 2-4, Comparative Example 2-4). Slurry was forced into the cells in such a manner that the honeycomb structure was disposed on the upper side and the container was disposed on the

TABLE 1

| | Honeycomb structure | | Adhesive film used for masking | Mixing ratio of slurry | | | | Viscosity of slurry (Pa · s) | Method of forcing slurry in cells | Frequency in generation of shrunk dents (%) |
| | | | | Cordierite (parts by mass) | Binder | | Deflocculant (parts by mass) | | | |
| | Whole shape | Cell shape | | | Kind | (parts by mass) | | | | |
|---|---|---|---|---|---|---|---|---|---|---|
| Comp. Ex. 1-1 | Cylindrical | Square | Polyester, 0.05 mm | 100 | methyl-cellulose | 0.3 | 0.4 | 16 | Method A | 22.4 |
| Example 1-1 | Cylindrical | Square | Polyester, 0.05 mm | 100 | methyl-cellulose | 0.3 | 0.4 | 16 | Method A | 2.3 |
| Comp. Ex. 1-2 | Quadratic prism-shaped | Square | Polyester, 0.05 mm | 100 | methyl-cellulose | 0.3 | 0.4 | 16 | Method A | 15.8 |
| Example 1-2 | Quadratic prism-shaped | Square | Polyester, 0.05 mm | 100 | methyl-cellulose | 0.3 | 0.4 | 16 | Method A | 1.8 |
| Comp. Ex. 1-3 | Triangular prism-shaped | Square | Polyester, 0.05 mm | 100 | methyl-cellulose | 0.3 | 0.4 | 16 | Method A | 18.4 |
| Example 1-3 | Triangular prism-shaped | Square | Polyester, 0.05 mm | 100 | methyl-cellulose | 0.3 | 0.4 | 16 | Method A | 2.5 |

EXAMPLE 2 AND COMPARATIVE EXAMPLE 2

In Example 2 and Comparative Example 2, plugged portions were formed by the second method of the present invention and a conventional method, and kind and thickness of adhesive films used for masking were appropriately varied upon giving evaluation for the state of generation of shrunk dents, and thereby influence of kind and thickness of adhesive films used for masking was confirmed.

In Example 2 and Comparative Example 2, cylindrical honeycomb structures having a circular bottom having a lower side and that a pressure was applied from the honeycomb structure side (referred to as "method A" in Table).

As a result, as shown in Table 2, frequency in generation of shrunk dents, which was about 15–24% in Comparative Example 2 (conventional method), was reduced to about 1–3% in Example 2 (second method of the present invention). This tendency was the same regardless of shape of kind and thickness of the adhesive films used for masking. That is, in all the adhesive films of various materials and thicknesses mentioned above, frequency in generation of shrunk dents was reduced to about 1–3%.

TABLE 2

| | Honeycomb structure | | Adhesive film used for masking | Mixing ratio of slurry | | | | Viscosity of slurry (Pa · s) | Method of forcing slurry in cells | Frequency in generation of shrunk dents (%) |
| | | | | Cordierite (parts by mass) | Binder | | Deflocculant (parts by mass) | | | |
| | Whole shape | Cell shape | | | Kind | (parts by mass) | | | | |
|---|---|---|---|---|---|---|---|---|---|---|
| Comp. Ex. 2-1 | Cylindrical | Square | Thermosetting resin, 3 mm | 100 | methyl-cellulose | 0.3 | 0.4 | 16 | Method A | 22.6 |
| Example 2-1 | Cylindrical | Square | Thermosetting resin, 3 mm | 100 | methyl-cellulose | 0.3 | 0.4 | 16 | Method A | 2.4 |
| Comp. Ex. 2-2 | Cylindrical | Square | Thermosetting resin, 1.5 mm | 100 | methyl-cellulose | 0.3 | 0.4 | 16 | Method A | 23.5 |
| Example 2-2 | Cylindrical | Square | Thermosetting resin, 1.5 mm | 100 | methyl-cellulose | 0.3 | 0.4 | 16 | Method A | 2.2 |
| Comp. Ex. 2-3 | Cylindrical | Square | Polyester, 0.05 mm | 100 | methyl-cellulose | 0.3 | 0.4 | 16 | Method A | 15.8 |

TABLE 2-continued

| Honeycomb structure | | Adhesive film used for masking | Mixing ratio of slurry | | | | Viscosity of slurry (Pa·s) | Method of forcing slurry in cells | Frequency in generation of shrunk dents (%) |
|---|---|---|---|---|---|---|---|---|---|
| Whole shape | Cell shape | | Cordierite (parts by mass) | Binder Kind | (parts by mass) | Deflocculant (parts by mass) | | | |
| Example 2-3 | Cylindrical | Square | Polyester, 0.05 mm | 100 | methyl-cellulose | 0.3 | 0.4 | 16 | Method A | 1.8 |
| Comp. Ex. 2-4 | Cylindrical | Square | Polyester, 0.025 mm | 100 | methyl-cellulose | 0.3 | 0.4 | 16 | Method A | 18.4 |
| Example 2-4 | Cylindrical | Square | Polyester, 0.025 mm | 100 | methyl-cellulose | 0.3 | 0.4 | 16 | Method A | 2.1 |

EXAMPLE 3 AND COMPARATIVE EXAMPLE 3

In Example 3 and Comparative Example 3, plugged portions were formed by the second method of the present invention and a conventional method, and shape of cells of the honeycomb structures were appropriately varied upon giving evaluation for the state of generation of shrunk dents, and thereby influence of shapes of cells of the honeycomb structures was confirmed.

In Example 3 and Comparative Example 3 were used the honeycomb structures having a cylindrical bottom having a circular bottom having a diameter of 144 mm and a length of 150 mm and cells having the shapes described below.

Honeycomb structures each having cells having one of the following three kinds of shapes were used. ① square cell (FIG. 9(a): Reference Numeral 3a): a regular square having a side of 1.2 mm (Example 3-1, Comparative Example 3-1) ② hexagonal cell (FIG. 9(b): Reference Numeral 3b): a regular hexagon having a diagonal of 1.5 mm (Example 3-2, Comparative Example 3-2) ③ triangular cell (FIG. 9(c): Reference Numeral 3c): a regular triangle having a side of 2.0 mm (Example 3-3, Comparative Example 3-3). Each of these honeycomb structures has a partition wall thickness of 300 μm, cell density of 300/in², total number of cells of 7500. Incidentally, in FIG. 9(a) to FIG. 9(c), reference numerals 2a, 2b, and 2c denotes plugged portions.

As in Example 2-3, polyester adhesive films having a thickness of 0.05 mm were used for masking. Incidentally, since it is impossible to alternately plug adjacent cells (i.e. to plug checkerwise) in the case that cells have a hexagonal shape, plugged portions 2b were formed in a striped pattern as shown in FIG. 9(b). Slurry was forced into the cells in such a manner that the honeycomb structure was disposed on the upper side and the container was disposed on the lower side and that a pressure was applied from the honeycomb structure side (referred to as "method A" in Table).

As a result, as shown in Table 3, frequency in generation of shrunk dents, which was about 15–23% in Comparative Example 3 (conventional method), was reduced to about 1–3% in Example 3 (second method of the present invention). This tendency was the same regardless of shape of the cells of the honeycomb structures. That is, in all the honeycomb structures having cells of shapes mentioned above, frequency in generation of shrunk dents was reduced to about 1–3%.

TABLE 3

| Honeycomb structure | | Adhesive film used for masking | Mixing ratio of slurry | | | | Viscosity of slurry (Pa·s) | Method of forcing slurry in cells | Frequency in generation of shrunk dents (%) |
|---|---|---|---|---|---|---|---|---|---|
| Whole shape | Cell shape | | Cordierite (parts by mass) | Binder Kind | (parts by mass) | Deflocculant (parts by mass) | | | |
| Comp. Ex. 3-1 | Cylindrical | Square | Polyester, 0.05 mm | 100 | methyl-cellulose | 0.3 | 0.4 | 16 | Method A | 15.8 |
| Example 3-1 | Cylindrical | Square | Polyester, 0.05 mm | 100 | methyl-cellulose | 0.3 | 0.4 | 16 | Method A | 1.8 |
| Comp. Ex. 3-2 | Cylindrical | Hexagonal | Polyester, 0.05 mm | 100 | methyl-cellulose | 0.3 | 0.4 | 16 | Method A | 19.3 |
| Example 3-2 | Cylindrical | Hexagonal | Polyester, 0.05 mm | 100 | methyl-cellulose | 0.3 | 0.4 | 16 | Method A | 2.3 |
| Comp. Ex. 3-3 | Cylindrical | Triangular | Polyester, 0.05 mm | 100 | methyl-cellulose | 0.3 | 0.4 | 16 | Method A | 22.7 |
| Example 3-3 | Cylindrical | Triangular | Polyester, 0.05 mm | 100 | methyl-cellulose | 0.3 | 0.4 | 16 | Method A | 2.1 |

EXAMPLE 4 AND COMPARATIVE EXAMPLE 4

In Example 4 and Comparative Example 4, plugged portions were formed by the second method of the present invention and a conventional method, and methods of forcing slurry into cells were appropriately varied upon giving evaluation for the state of generation of shrunk dents, and thereby influence of methods of forcing slurry into cells was confirmed.

In Example 4 and Comparative Example 4, cylindrical honeycomb structures having a circular bottom having a diameter of 144 mm and a length of 150 mm, a square cell shape, a partition wall thickness of 300 μm, cell density of 300/in², total number of cells of 7500 were used as in the Example 1-1. As in Example 2-3, polyester adhesive films having a thickness of 0.05 mm were used for masking.

Forcing slurry into cells were conducted by the following four kinds of methods. ① The honeycomb structure was disposed on the upper side, the container was disposed on the lower side, and pressure was applied from the honeycomb structure side (ref. FIG. 10(a), Example 4-1, Comparative Example 4-1, referred to as "method A" in Table 4). ② The container was disposed on the upper side, the honeycomb structure was disposed on the lower side, and pressure was applied from the container side (ref. FIG. 10(b), Example 4-2, Comparative Example 4-2, referred to as "method B" in Table 4). ③ The honeycomb structure and the container was disposed in a lateral direction, and pressure was applied from the container side (ref. FIG. 10(c), Example 4-3, Comparative Example 4-3, referred to as "method C" in Table 4). ④ The honeycomb structure and the container was disposed in a lateral direction, and pressure was applied from the honeycomb structure side (ref. FIG. 10(d), Example 2-4, Comparative Example 2-4, referred to as "method D" in Table 4). Incidentally, in FIG. 10(a) to FIG. 10(d), Reference Numerals 1, 9, and 9a denote honeycomb structure, container, and a bottom portion (of container), respectively.

As a result, as shown in Table 4, frequency in generation of shrunk dents, which was about 15–17% in Comparative Example 4 (conventional method), was reduced to about 1–3% in Example 4 (second method of the present invention). This tendency was the same regardless of method of forcing slurry into cells. That is, in all the methods of forcing slurry into cells mentioned above, frequency in generation of shrunk dents was reduced to about 1–3%.

from each other in advance before bringing out the honeycomb structure from the container. Therefore, a method of the present invention can effectively inhibit generation of shrunk dents or holes passing through the plugged portions.

The invention claimed is:

1. A method of producing a honeycomb structure comprising the steps of:

forming plugged portions by dipping an end face of a honeycomb structure having cells each functioning as a fluid passage in slurry containing at least ceramic particles and dispersion medium in a container, and pressing the honeycomb structure against an inner bottom surface of the container to force the slurry into at least some of the cells; and bringing out the honeycomb structure from the container to obtain the honeycomb structure having at least some of the cells being plugged, characterized by forming an air layer between the inner bottom surface of the container and the plugged portions to separate the inner bottom surface and the plugged portions in advance of bringing out the honeycomb structure from the container.

2. The method of producing a honeycomb structure according to claim 1, wherein the plugged portions are formed by masking some of the cells at the end face of the honeycomb structure, dipping the masked end face of the honeycomb structure in the slurry in the container, and pressing the honeycomb structure against the inner bottom surface of the container to force the slurry into non-masked cells.

3. The method of producing a honeycomb structure according to claim 1, wherein, after forming the plugged portions, the end face having the plugged portions is rotated relative to the inner bottom surface of the container, thereby

TABLE 4

| | Honeycomb structure | | Adhesive film used for masking | Mixing ratio of slurry | | | | Viscosity of slurry (Pa · s) | Method of forcing slurry in cells | Frequency in generation of shrunk dents (%) |
| | | | | Cordierite (parts by mass) | Binder | | Deflocculant (parts by mass) | | | |
| | Whole shape | Cell shape | | | Kind | (parts by mass) | | | | |
|---|---|---|---|---|---|---|---|---|---|---|
| Comp. Ex. 4-1 | Cylindrical | Square | Polyester, 0.05 mm | 100 | methyl-cellulose | 0.3 | 0.4 | 16 | Method A | 15.8 |
| Example 4-1 | Cylindrical | Square | Polyester, 0.05 mm | 100 | methyl-cellulose | 0.3 | 0.4 | 16 | Method A | 1.8 |
| Comp. Ex. 4-2 | Cylindrical | Square | Polyester, 0.05 mm | 100 | methyl-cellulose | 0.3 | 0.4 | 16 | Method B | 15.3 |
| Example 4-2 | Cylindrical | Square | Polyester, 0.05 mm | 100 | methyl-cellulose | 0.3 | 0.4 | 16 | Method B | 2.0 |
| Comp. Ex. 4-3 | Cylindrical | Square | Polyester, 0.05 mm | 100 | methyl-cellulose | 0.3 | 0.4 | 16 | Method C | 16.8 |
| Example 4-3 | Cylindrical | Square | Polyester, 0.05 mm | 100 | methyl-cellulose | 0.3 | 0.4 | 16 | Method C | 1.9 |
| Comp. Ex. 4-4 | Cylindrical | Square | Polyester, 0.05 mm | 100 | methyl-cellulose | 0.3 | 0.4 | 16 | Method D | 15.9 |
| Example 4-4 | Cylindrical | Square | Polyester, 0.05 mm | 100 | methyl-cellulose | 0.3 | 0.4 | 16 | Method D | 2.1 |

INDUSTRIAL APPLICABILITY

As described above, in a method of the honeycomb structure, plugged portions are formed by pressing an end face of the honeycomb structure against an inner bottom surface of the container to force the slurry into cells, and then forming an air layer between the inner bottom surface of the container and the plugged portions to separate them forming the air layer between the inner bottom surface of the container and the plugged portions to separate the inner bottom surface and the plugged portions in advance of bringing out the honeycomb structure.

4. The method of producing a honeycomb structure according to claim 1, wherein, after forming the plugged portions, a bottom portion of the container is moved in a lateral direction to open the bottom surface of the container, thereby forming the air layer between the inner bottom surface of the container and the plugged portions to separate the inner bottom surface and the plugged portions in advance of bringing out the honeycomb structure.

5. The method of producing a honeycomb structure according to claim 1, wherein, after forming the plugged portions, air is introduced between the plugged portions and the inner bottom surface of the container, thereby forming the air layer between the inner bottom surface of the container and the plugged portions to separate the inner bottom surface and the plugged portions in advance of bringing out the honeycomb structure.

6. The method of producing a honeycomb structure according to claim 2, wherein, after forming the plugged portions, the end face having the plugged portions is rotated relative to the inner bottom surface of the container, thereby forming the air layer between the inner bottom surface of the container and the plugged portions to separate the inner bottom surface and the plugged portions in advance of bringing out the honeycomb structure.

7. The method of producing a honeycomb structure according to claim 2, wherein, after forming the plugged portions, bottom portion of the container is moved in a lateral direction to open the bottom surface of the container, thereby forming the air layer between the inner bottom surface of the container and the plugged portions to separate the inner bottom surface and the plugged portions in advance of bringing out the honeycomb structure.

8. The method of producing a honeycomb structure according to claim 2, wherein, after forming the plugged portions, air is introduced between the plugged portions and the inner bottom surface of the container, thereby forming the air layer between the inner bottom surface of the container and the plugged portions to separate the inner bottom surface and the plugged portions in advance of bringing out the honeycomb structure.

* * * * *